(12) United States Patent
Wyatt (10) Patent No.: US 6,469,640 B2
(45) Date of Patent: *Oct. 22, 2002

(54) AIRCRAFT DISPLAY WITH POTENTIAL THRUST INDICATOR

(75) Inventor: Ivan Sandy Wyatt, Scottsdale, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/863,214

(22) Filed: May 21, 2001

(65) Prior Publication Data

US 2002/0036573 A1 Mar. 28, 2002

Related U.S. Application Data

(63) Continuation of application No. 09/637,262, filed on Aug. 10, 2000, now Pat. No. 6,262,674.

(51) Int. Cl.[7] ............................................. G01C 23/00
(52) U.S. Cl. ....................... 340/975; 244/1 R; 340/945; 340/973
(58) Field of Search ................................ 340/975, 974, 340/973, 945, 946, 959, 966, 967, 969, 971, 978, 980; 244/1 R; 701/4, 6, 14, 15; 73/178 T (56) References Cited

U.S. PATENT DOCUMENTS

| | | | | |
|---|---|---|---|---|
| 4,668,622 A | * | 5/1987 | Gannett et al. | |
| 5,150,117 A | * | 9/1992 | Hamilton et al. | 340/973 |
| 5,797,562 A | * | 8/1998 | Wyatt | 340/974 |
| 6,057,786 A | * | 5/2000 | Briffe et al. | 340/975 |
| 6,107,943 A | * | 8/2000 | Schroeder | 340/973 |
| 6,150,960 A | * | 11/2000 | Voulgaris | 340/975 |
| 6,262,674 B1 | * | 7/2001 | Wyatt | 340/975 |

* cited by examiner

Primary Examiner—Brent A. Swarthout (57) ABSTRACT

An aircraft display apparatus combines a flight path vector group with a potential thrust indicator. The display apparatus comprises a display screen and a pitch ladder symbol, a horizontal line and a flight path vector group displayed on the display screen. The flight path vector group comprises a flight path vector symbol, a potential flight path vector symbol, and a potential thrust symbol. The potential thrust symbol further comprises a thrust and drag limit symbol and at least one throttle symbol. The flight path vector group is oriented on the display screen in relation to the pitch ladder and the horizontal line. The position of the potential thrust symbol relative to the pitch ladder, flight path vector symbol and the potential flight path vector symbol represents current engine power and power limits of the aircraft.

52 Claims, 6 Drawing Sheets

AIRCRAFT DISPLAY WITH POTENTIAL THRUST INDICATOR

CROSS REFERENCE TO RELATED APPLICATIONS

This application is a continuation of U.S. patent application Ser. No. 09/637,262, filed Aug. 10, 2000, now U.S. Pat. No. 6,262,674 which is hereby incorporated by reference.

FIELD OF THE INVENTION

The present invention relates generally to electronic displays for aircraft and more specifically to potential thrust indicator symbology in an aircraft cockpit display for displaying aircraft engine thrust (or engine power) in terms of actual and potential aircraft flight path.

BACKGROUND OF THE INVENTION

Experienced aircraft pilots are familiar with aircraft handling qualities under normal flight conditions. Thrust, weight, lift, and drag are the forces that act upon an aircraft. Maneuvering is accomplished by variations of these forces and is controlled by the throttles and flight controls. The power produced by the engines determines the angle that an aircraft can fly and still maintain airspeed (e.g. neither accelerate nor decelerate). Similarly, the drag on the airplane determines the descent angle that the airplane can fly and not accelerate. Aircraft drag and engine thrust models are used to indicate engine thrust as a climb or descent angle on the display where the greatest climb and the greatest descent angle represents the maximum and minimum power parameters.

Figure 1:
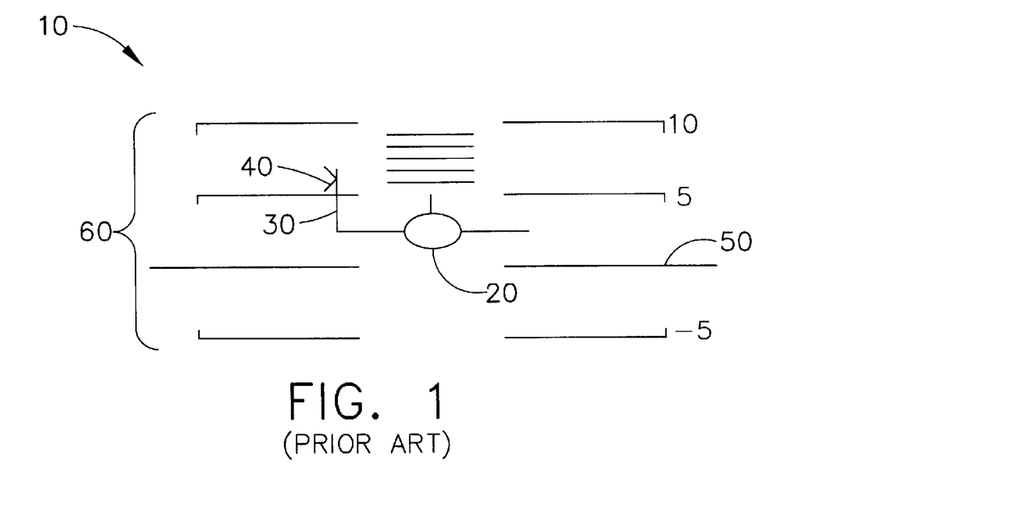
FIG. 1 illustrates the display format of a flight path vector group without the present invention.

Electronic displays such as Primary Flight Displays (PFD's), Head-Up Displays (HUD's), Head-Down Displays (HDD's) and the like are well known and widely used to display information in aircraft. FIG. 1 illustrates a conventional flight path vector group 10 presented to an aircraft pilot on an attitude display. The display shows a horizontal line 50, which indicates the axis of flight parallel to the horizon. Pitch ladder 60 indicates the pitch or potential pitch of the plane. A flight path vector (FPV) indicator 20 represents the sum of all forces acting on the aircraft and indicates the direction of aircraft translation through space. A speed error indicator 30 emanates from the FPV indicator 20 and represents the difference between the selected airspeed and the current airspeed. The potential flight path vector (PFPV) indicator 40 is displayed in reference to the FPV indicator 20. PFPV indicator 40 is an indication of the aircraft's instantaneous acceleration along the flight path. The angle at which the PFPV indicator 40 is displayed relative to the pitch ladder represents the acceleration scaled by the acceleration due to gravity. The FPV indicator 20 and the PFPV indicator 40 may be obtained from onboard inertial reference systems, Global Positioning System (GPS) aided attitude sensors, or the like. In FIG. 1, the display indicates that the aircraft is accelerating (the PFPV indicator 40 is above FPV indicator 20). Further, PFPV indicator 40 indicates that the flight path may be increased to approximately a 6-degree climb with no acceleration along the flight path.

However, with the prior art displays as described above, the pilot is given no direct indication of thrust. Rather, the pilot must utilize some internal model (usually gained through experience) based on the existing engine displays. Thus, there exists a need for an aircraft display which not only provides the pilot with a means for directly setting engine power to achieve desired performance, but also enables precise aircraft speed control with a reduction in pilot workload and provides control symbology in the pilot's primary field of view.

SUMMARY OF THE DISCLOSURE

Various aspects of the present invention provide an aircraft display apparatus which combines a flight path vector group with a potential thrust indicator to reduce pilot workload. The display apparatus includes a display screen, a pitch ladder symbol displayed on the screen, a horizontal line (representing level flight) displayed on the screen and a flight path vector group displayed on the screen. The flight path vector group includes a flight path vector symbol, a potential flight path vector symbol, a potential thrust symbol, and a speed error indicator. The flight path vector group is oriented on the display screen in relation to the pitch ladder and the horizontal line. The position of the potential thrust symbol is relative to the pitch ladder and represents current engine power and power limits of the aircraft.

In accordance with another embodiment of the present invention, the potential thrust symbol further comprises a thrust and drag limit symbol and at least one throttle symbol.

In accordance with yet another embodiment of the present invention, the potential thrust symbol indicates the aircraft's climb capability with a failed engine.

In accordance with a further embodiment of the present invention, the potential thrust symbol indicates the potential aircraft descent angle when drag devices such as speed brakes, flaps and landing gear are activated.

These and other aspects of the present invention are described in the following description, attached drawings and claims.

BRIEF DESCRIPTION OF THE DRAWINGS

A detailed description of embodiments of the invention will be made with reference to the accompanying drawings, wherein like numerals designate corresponding parts in the several figures, and wherein.

DETAILED DESCRIPTION OF THE INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 2:
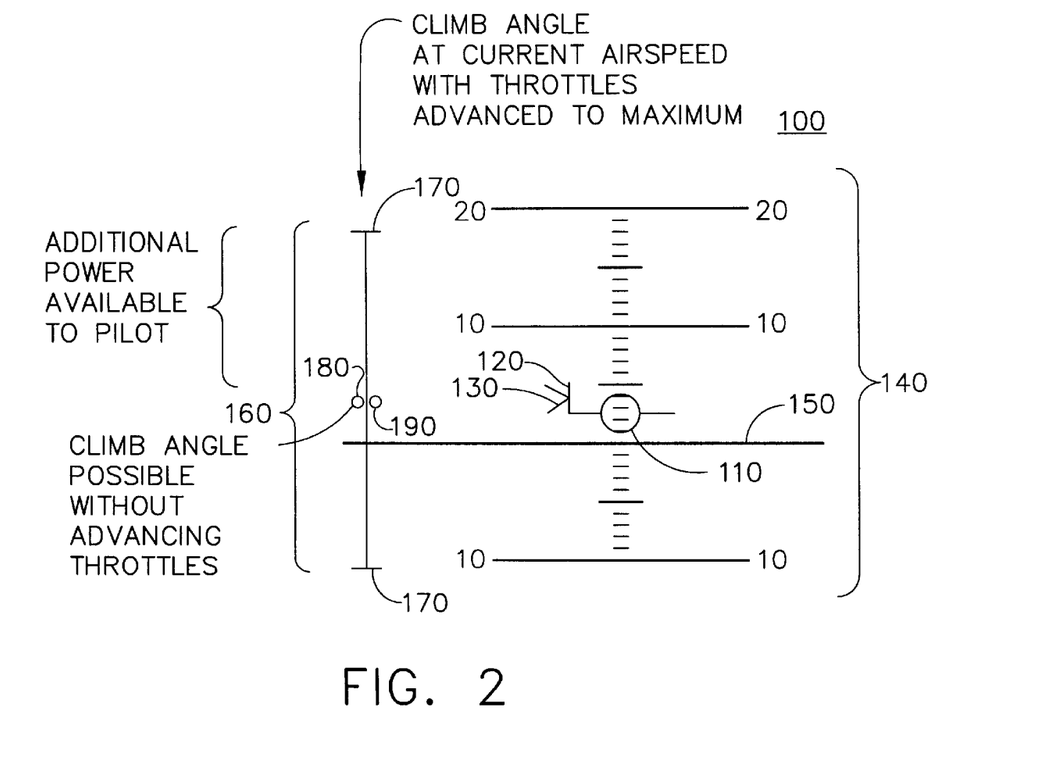
FIG. 2 illustrates a display format of the present invent

Referring now to FIG. 2, a display of an exemplary embodiment of the present invention suitably includes a flight path vector group 100 which includes a FPV indicator 110, a speed error indicator 120, and a PFPV indicator 130. In addition, flight path vector group 100 of the present invention comprises a potential thrust indicator 160. Potential thrust indicator 160 provides the pilot with a means for setting engine power to achieve a desired aircraft flight path and acceleration. Potential thrust indicator 160 further includes thrust/drag limit indicators 170 and first and second throttle indicators 180 and 190. FIG. 2 further shows a pitch ladder 140, which corresponds to the pitch of the aircraft, and a horizontal line 150, which corresponds to the axis of flight parallel to the horizon. The entire flight path vector group moves with respect to pitch ladder 140. The numeric values associated with the above symbology elements of the flight path vector group may be determined from inertial data or other GPS aided attitude sensors.

As in the prior art, the FPV indicator 110 represents where the aircraft is moving through space. The PFPV indicator 130 represents the angle that the aircraft may climb or descend while maintaining current airspeed, e.g., the pilot may "fly" the FPV indicator 110 to the PFPV indicator 130 changing the aircraft's path through space while maintaining airspeed. However, using the potential thrust indicator 160 in relation to the flight path vector group display, the pilot now may directly move the throttles to set engine power to achieve a desired PFPV indicator setting. As described below, the PFPV is an expression of the aircraft's longitudinal acceleration scaled by the acceleration due to gravity (≈32.1 feet/sec*sec). Advancing the throttles while keeping all else constant will add energy to the airplane and cause it to accelerate. The pilot controls this acceleration referencing the changes in the placement of the PFPV. The power produced by the engines determines the angle that the aircraft may fly and still maintain airspeed (e.g., neither accelerate nor decelerate). Similarly, the drag on the airplane determines the descent angle that the airplane may fly and not accelerate. The thrust/drag limit indicators 170 indicate to the pilot the maximum climb angle achievable at maximum power without acceleration and the maximum descent angle possible at maximum drag without acceleration. The throttle indicators 180 and 190 display the engine thrust contribution to the inertial indications.

Figure 3:
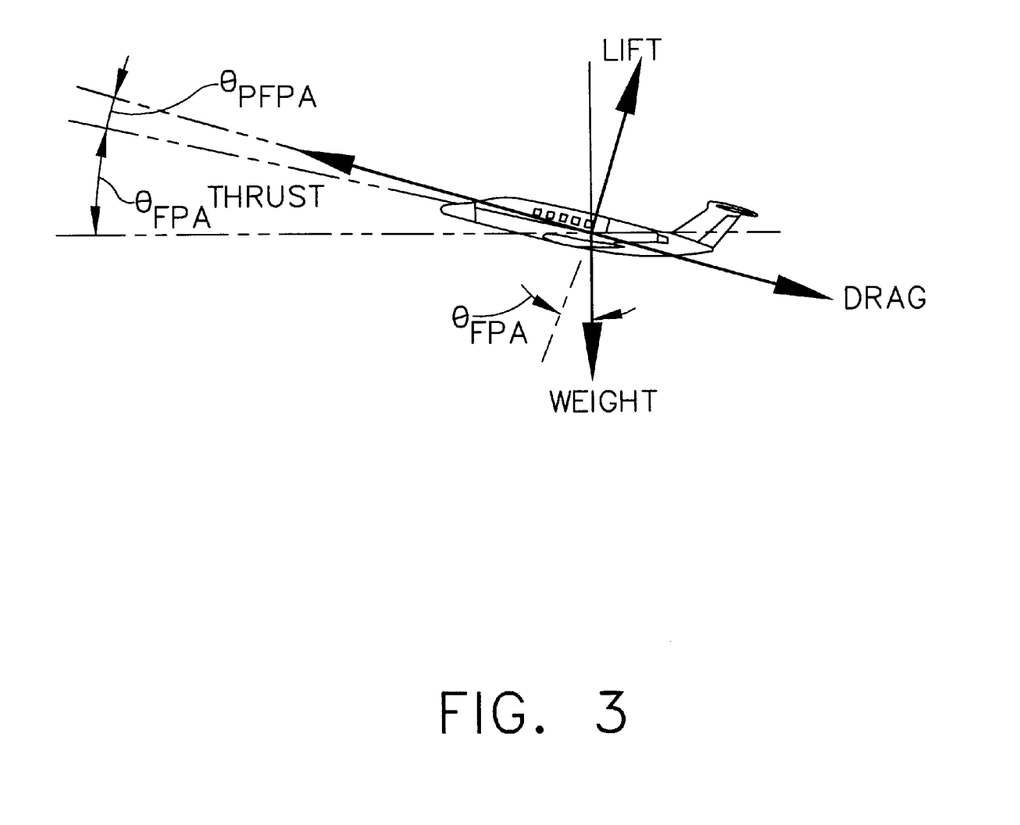
FIG. 3 illustrates forces that act on an aircraft in flight.

The potential thrust available to an aircraft may be represented by a mathematical equation. Referring now to FIG. 3, the forces acting on an aircraft in flight include thrust, lift, drag and weight. The current power of the aircraft engines and current vertical speed determines the potential flight path angle $\emptyset_{PFPA}$. A flight path angle $\emptyset_{FPV}$ is the direction of flight with respect to the earth. The "specific excess power," $P_s$ (e.g., the excess power per unit weight), available from the engines is calculated using the following equation:

$$P_s = \frac{TV - DV}{W} = \frac{dh}{dt} + \frac{V}{g}\frac{dV}{dt} \quad (1)$$

where T is the thrust, V is the velocity, D is drag, W is weight, g is gravity, dh/dt is the climb rate, dv/dt is the acceleration of the aircraft and flight is at one "g." By dividing the equation by V, the equation becomes one of "excess thrust" per unit weight and has no. units of dimension:

$$\frac{T-D}{W} = \frac{1}{V}\frac{dh}{dt} + \frac{1}{g}\frac{dV}{dt} \quad (2)$$

The term on the left represents the net power being applied to the aircraft by the engines minus the drag. The position of throttle indicators 180 and 190 is scaled to this value by an air data computer. The maximum position of thrust/drag limit indicator 170 may be determined by the value of this term when throttles are at a maximum and drag is at a minimum. The minimum position of thrust/drag limit indicator 170 may be determined by the value of the same term when drag is at a maximum and thrust is at a minimum. As is evident from this equation, when a pilot wishes to maintain current aircraft speed, dv/dt is zero. Consequently, an increase in thrust will result in aircraft climb. Similarly, when a pilot wishes to maintain current altitude, dh/dt is zero. Accordingly, any increase in thrust will result in acceleration.

Referring again to FIG. 3, each term in Equation 2 can be expressed as an angle:

$$\emptyset_{TA} = \emptyset_{FPA} + \emptyset_{PFPA}$$

where $\emptyset_{TA}$ is the excess thrust angle, $\emptyset_{FPA}$ is the flight path angle and $\emptyset_{PFPA}$ is the potential flight path angle. Modifications to the excess thrust calculation may be applied to account for flight in other than one "g" situations.

Figure 4A:
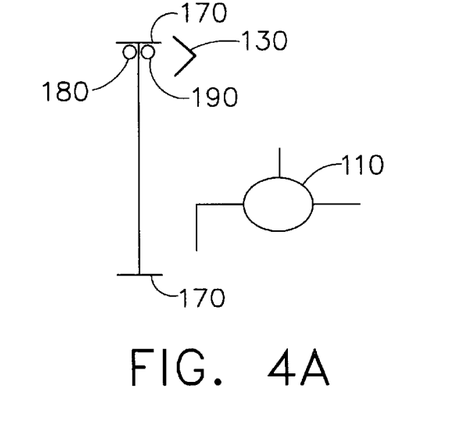
FIGS. 4A–E illustrates displays of the present invention in five different operational situations.
Figure 4B:
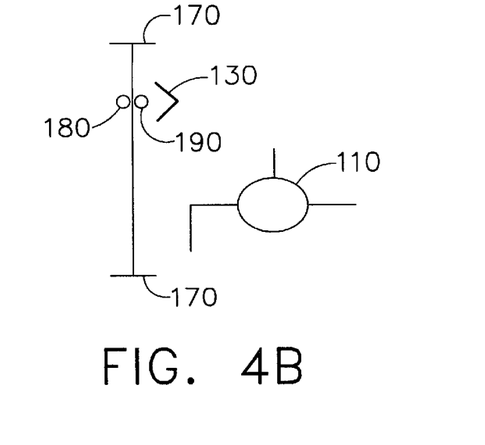
Figure 4C:
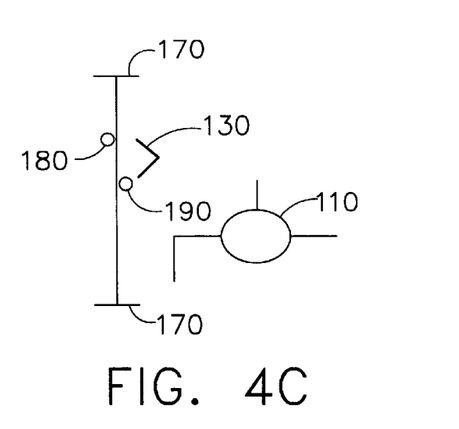
Figure 4D:
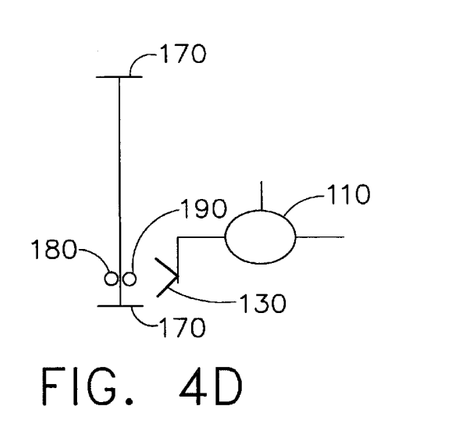
Figure 4E:
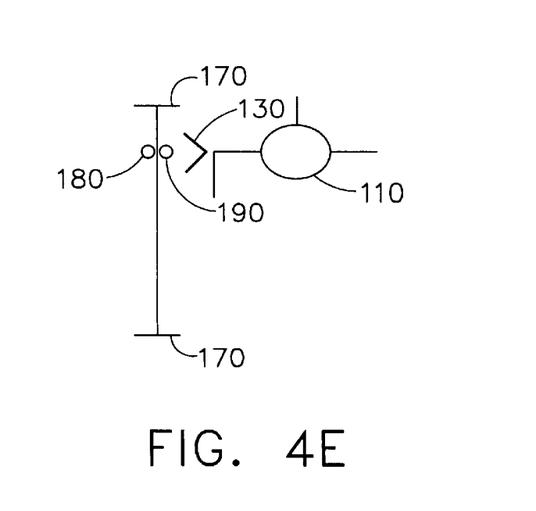

FIGS. 4A–4E illustrates the displays of exemplary embodiments for five different operational situations. In FIG. 4A, the pilot has selected maximum power, as is evident by the fact that throttle indicators 180 and 190 and PFPV indicator 130 are at the maximum thrust/drag limit indicator 170. In FIG. 4B, the pilot has selected a power setting less than maximum and the aircraft is accelerating (PFPV indicator 130 is above FPV indicator 110). In FIG. 4C, the throttles are split (i.e., not at the same power setting) and below maximum power and the aircraft is accelerating. In FIG. 4D, the power is set below maximum power and the aircraft is decelerating. In FIG. 4E, the power is set near maximum power and the aircraft is maintaining current airspeed.

Figure 5:
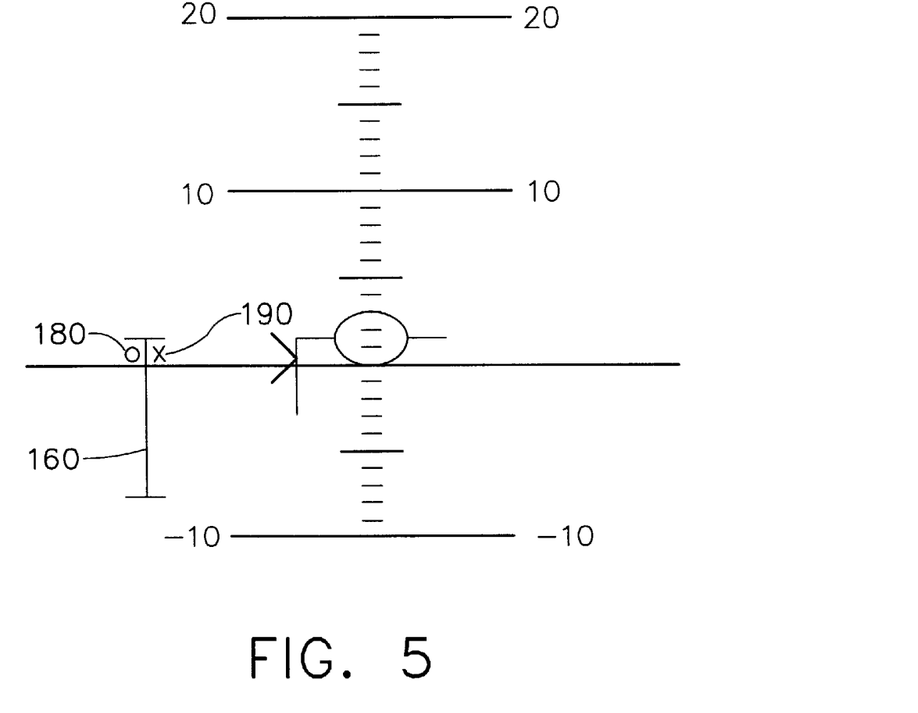
FIG. 5 illustrates a display format of the present invention indicating failure of an engine.

The present invention may also inform the pilot of available power when an engine has failed. By way of example, FIG. 5 shows a potential thrust indicator 160 with throttle indicator 190 represented by an "x", indicating that the right engine has failed. The left engine is at full power. By using potential thrust indicator 160, the pilot may determine the aircraft's climb capability with a failed engine.

Figure 6:
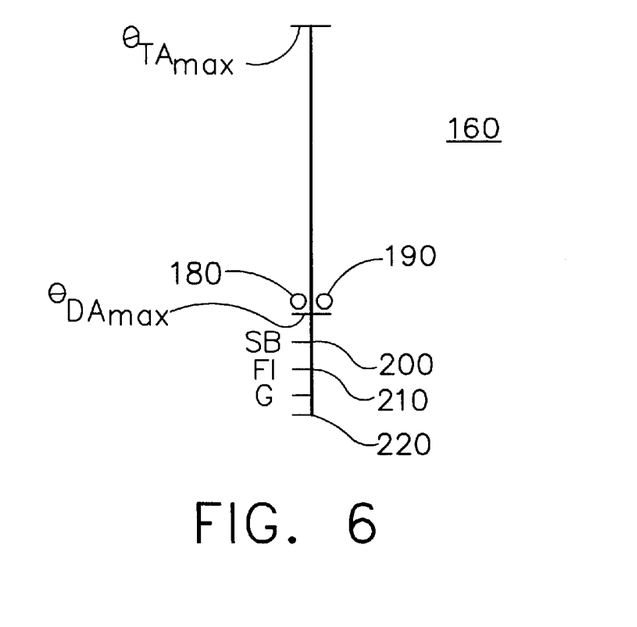
FIG. 6 illustrates a display format of the potential thrust indicator of the present invention with drag device symbology.

FIG. 6 shows a further optional embodiment of potential thrust indicator 160 of the present invention with symbology representing performance effects of drag devices. $\emptyset_{TAmax}$ represents the power available when thrust is at a maximum, $\emptyset_{DAmax}$ represents the power available when drag is at a maximum and throttle indicators 180 and 190 are shown at idle. When the pilot extends the aircraft speed brakes, a speed brake indicator 200 appears on the display. Speed brakes indicator 200 represents the descent angle possible with speed brakes of the aircraft extended. When the pilot extends aircraft wing flaps, a flaps indicator 210 appears on the display. Flaps indicator 210 represents the descent angle possible with the aircraft flaps extended. While FIG. 5 shows the descent angle possible with flaps one (F1) extended, it will be recognized that a plurality of flap indicators may be shown (e.g., F2, F3, . . . ) relative to the number of flaps on an aircraft. When the pilot extends the aircraft landing gear, a landing gear indicator 220 may appear on the display.

Landing gear indicator 220 represents the descent angle possible with the aircraft's landing gear extended.

Figure 7:
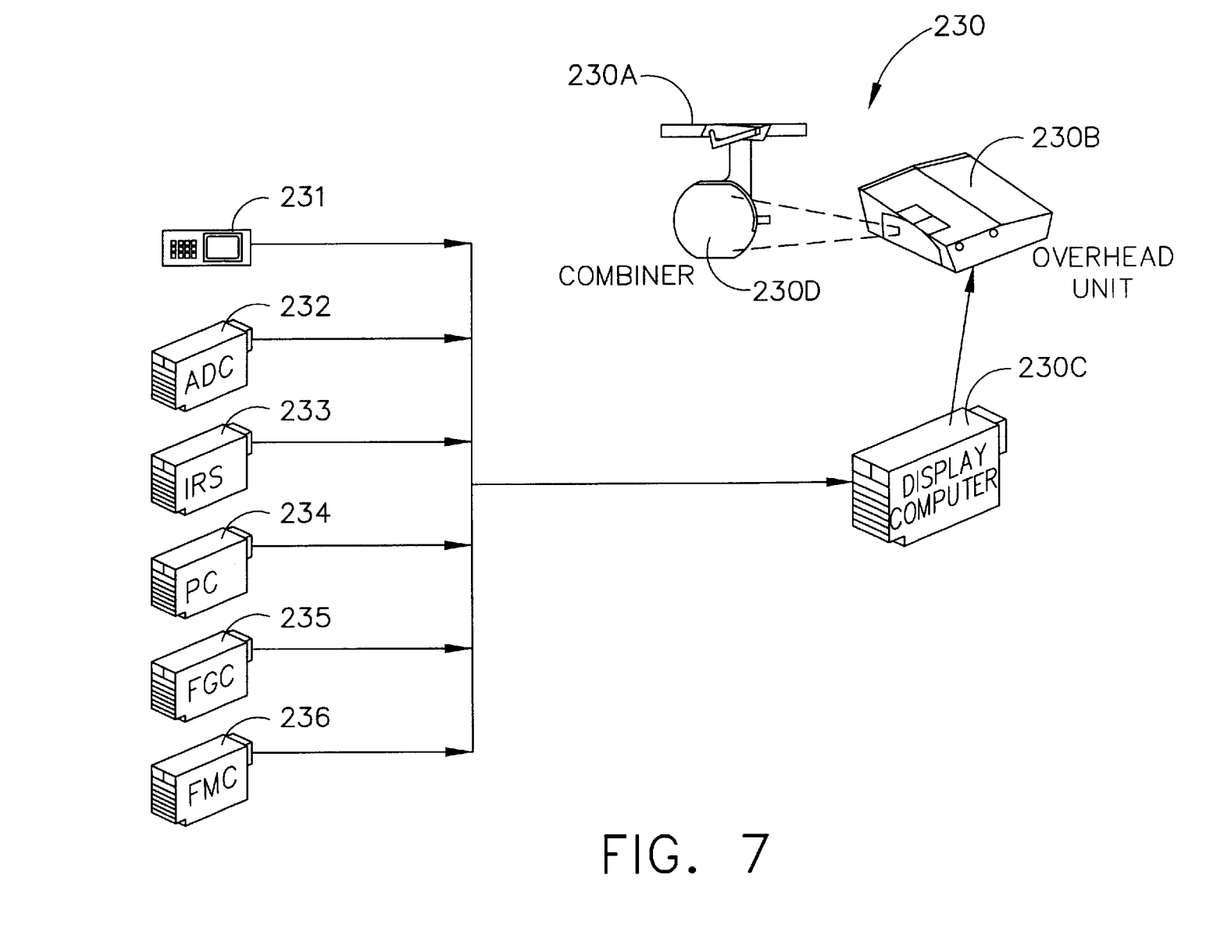
FIG. 7 illustrates components of an embodiment of the present invention.

FIG. 7 illustrates the components of an exemplary embodiment. The embodiment is implemented on a head-up display (HUD). HUD 230 includes a combiner 230A, an overhead unit 230B, and a display computer 230C. Display computer 230C communicates display data to overhead unit 230B which projects the display onto a display screen 230D of combiner 230A. The technology of these components is well known in the art and need not be described in further detail.

The invention is not limited to HUD's and may be implemented on any type of display including, but not limit to, CRT's, LCD's and HMD's (helmet-mounted displays). These displays are generically referred to as electronic displays and are interchangeable with HUD 230 for the purposes of the invention.

Electronic display (or HUD) 230 may obtain information from many aircraft systems depending on the specific implementation. These aircraft systems may include display controllers 231, air data computers (ADC) 232, inertial reference systems (IRS) 233, performance computers 234, flight guidance computers 235, flight management computers 236, and the like.

In an exemplary embodiment as shown in FIG. 7, various components may communicate information to electronic display 230. For example, a display controller 231 communicates commands (e.g., on/off, mode, brightness, etc.) to electronic display 230. An air data computer 232 communicates airspeeds, mach numbers, altitudes, vertical speeds, and the like. An inertial reference system 233 communicates acceleration data, attitude data, heading and position data, etc. A performance computer 234 communicates optimal flight path and cost information. A flight guidance computer 235 communicates guidance parameters. A flight management computer 236 communicates information including flight path information and waypoints. Of course, other embodiments may include various other components.

Figure 8:
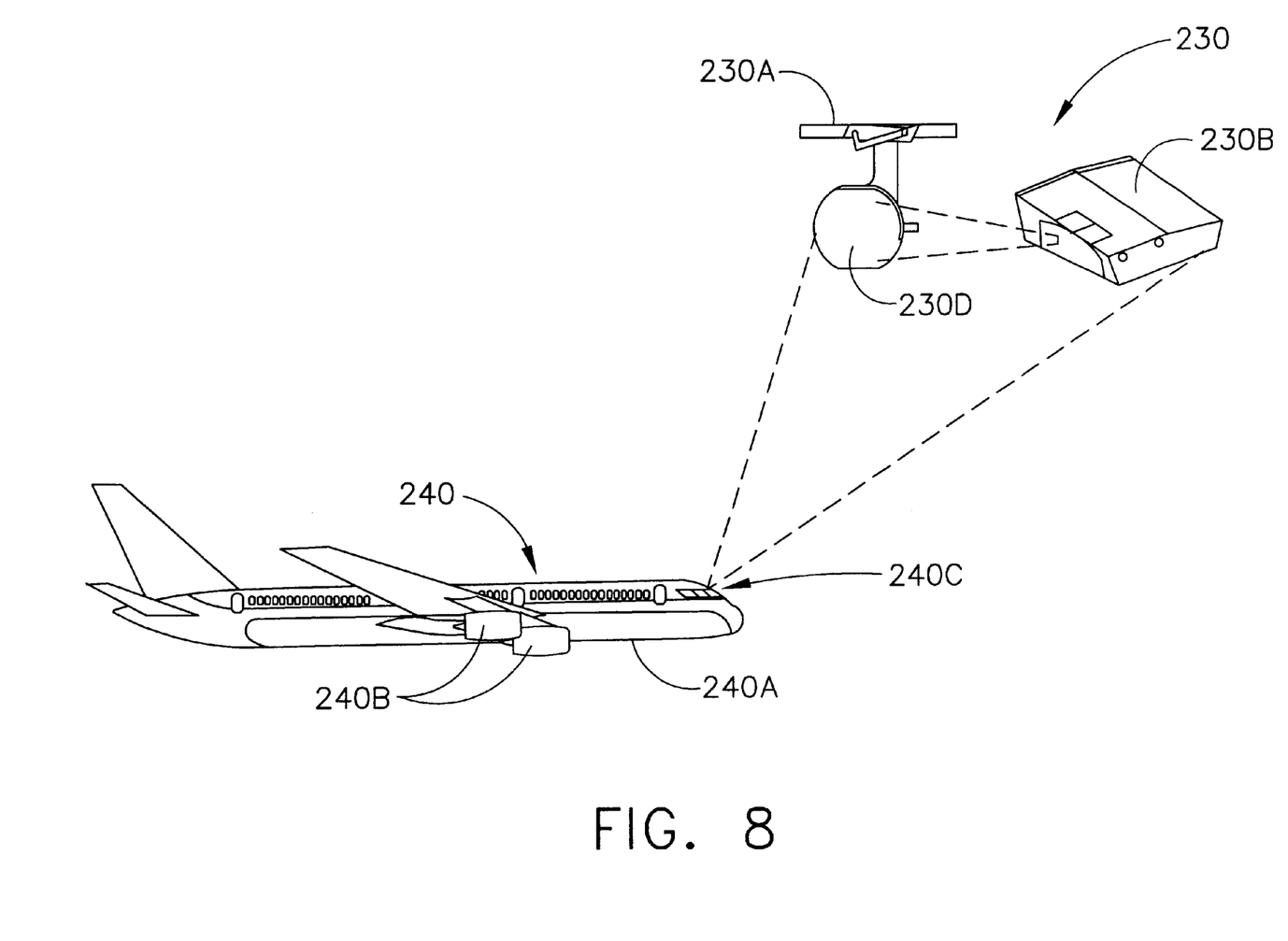
FIG. 8 illustrates the invention embodied in an aircraft.

FIG. 8 illustrates the invention embodied in an aircraft. An aircraft 240 includes a frame 240A, engines 240B, a cockpit 240C and electronic display 230 (shown external to the aircraft 240).

Thus, an aircraft display with a potential thrust indicator according to various aspects of the present invention provides an engine display that is physically located in the pilot's instrument scan area (on the attitude display or HUED, for example). Further, the aircraft display with potential thrust indicator provides to the pilot a means to determine engine power and engine throttle to set climb or descent angles of the aircraft. The aircraft display includes numerous other features and advantages that are not specifically identified herein. While the present invention has been described with reference to specific preferred embodiments thereof, various changes may be made without departing from the scope of the invention as claimed. In addition, many modifications may be made to adapt the present embodiments to a given situation without departing from it essential teachings.

I claim:

1. A method for displaying flight data information for an aircraft having engine power and engine limits, said method comprising:
   displaying a pitch ladder on a display, said pitch ladder representing a pitch of said aircraft; and
   displaying a flight path vector group on the display, said flight path vector group comprising:
   a flight path vector indicator;
   a potential flight path vector indicator; and
   a potential thrust indicator,
   a configuration of said potential thrust indicator relative to said pitch ladder, said flight path vector indicator and said potential flight path vector indicator representing at least one current engine power parameter and at least one desired engine power parameter of said aircraft.

2. The method of claim 1, said potential thrust indicator further comprising at least one thrust and drag limit indicator and at least one throttle indicator.

3. The method of claim 2, said aircraft having at least one operating engine, said step of displaying a flight path vector group further comprising displaying at least one throttle indicator, each throttle indicator corresponding to each operating engine.

4. The method of claim 2, said potential thrust indicator further comprising a minimum thrust and drag limit indicator.

5. The method of claim 2, said potential thrust indicator further comprising a maximum thrust and drag limit indicator.

6. The method of claim 1, further comprising displaying an image corresponding to an axis of flight of said aircraft parallel to a horizon.

7. The method of claim 6, wherein said image is a horizontal line.

8. The method of claim 6, said displaying a flight path vector group further comprising displaying a flight path vector group relative to said image.

9. The method of claim 1, said display comprising a HUD.

10. The method of claim 1, said display comprising a PFD.

11. The method of claim 1, said display comprising an HDD.

12. The method of claim 1, said display comprising an HMD.

13. The method of claim 1, said display comprising a CRT.

14. The method of claim 1, said display comprising an LCD.

15. A display apparatus for an aircraft comprising:
   a display;
   a pitch ladder indicator, transmitted to and viewable on said display, representative of a pitch of said aircraft;
   a horizontal image, transmitted to and viewable on said display, representative of an axis of flight parallel to a horizon; and
   a flight path vector group, transmitted to and viewable on said display, said flight path vector group further comprising:
   a flight path vector indicator;
   a potential flight path vector indicator; and
   a potential thrust indicator,
   a configuration of said potential thrust indicator relative to said pitch ladder indicator, said flight path vector indicator and said potential flight path vector indicator representing at least one current engine power parameter and at least one desired engine power parameter of said aircraft.

16. The display apparatus according to claim 15, said flight path vector group being oriented on said display in relation to said pitch ladder indicator and said horizontal image.

17. The display apparatus according to claim 15 said potential thrust indicator further comprising at least one thrust and drag limit indicator and at least one throttle indicator.

18. The display apparatus according to claim 17, said aircraft having at least one engine and each throttle indicator corresponding to each engine.

19. The display apparatus according to claim 15, said potential thrust indicator further comprising symbology representing current engine power and engine power limits of said aircraft with at least one drag device activated.

20. The display apparatus according to claim 19, said drag device comprising a speed brake.

21. The display apparatus according to claim 19, said drag device further comprising at least one wing flap position.

22. The display apparatus according to claim 19, said drag device further comprising landing gear.

23. A display apparatus according to claim 15, said display comprising a HUD.

24. A display apparatus according to claim 15, said display comprising a PFD.

25. A display apparatus according to claim 15, said display comprising an HDD.

26. A display apparatus according to claim 15, said display comprising an HMD.

27. A display apparatus according to claim 15, said display comprising a CRT.

28. A display apparatus according to claim 15, said display comprising an LCD.

29. A system for displaying engine power of an aircraft having a flight data controller, a display apparatus, and a display controller for transmitting flight data from said flight data controller to said display apparatus, said system comprising:
   a pitch ladder indicator transmitted to and viewable on said display apparatus representing the pitch of said aircraft;
   a horizontal line transmitted to and viewable on said display apparatus representing the axis of flight parallel to a horizon; and
   a flight path vector group transmitted to and viewable on said display, said flight path vector group further comprising:
      a flight path vector indicator;
      a potential flight path vector indicator; and
      a potential thrust indicator,
         a position of said potential thrust indicator relative to said pitch ladder, said flight path vector indicator and said potential flight path vector indicator representing current engine power parameters and desired engine power parameters of said aircraft, said flight path vector group being oriented on said display apparatus in relation to said pitch ladder and said horizontal line.

30. A system according to claim 29, said potential thrust indicator further comprising a thrust and drag limit indicator and at least one throttle indicator.

31. A system according to claim 30, said aircraft having at least one engine, each throttle indicator corresponding to each engine.

32. A system according to claim 29, said potential thrust indicator further comprising symbology representing engine power and engine power limits of said aircraft with a least one drag device activated.

33. A system according to claim 32, said drag device further comprising a speed brake.

34. A system according to claim 32, said drag device further comprising at least one wing flap position.

35. A system according to claim 32, said drag device further comprising landing gear.

36. A system according to claim 29, said display apparatus comprising a HUD.

37. A system according to claim 29, said display apparatus comprising a PFD.

38. A system according to claim 29, said display apparatus comprising an HDD.

39. A system according to claim 29, said display apparatus comprising an HMD.

40. A system according to claim 29, said display apparatus comprising a CRT.

41. A system according to claim 29, said display apparatus comprising an LCD.

42. A method for transmitting viewable flight data information on an aircraft display comprising the following steps:
   obtaining flight data information;
   manipulating said flight data information to obtain flight indicator information;
   presenting said flight indicator information on said display, said flight indicator information comprising:
      a pitch ladder indicator representing a pitch of an aircraft;
      a line representing the axis of flight parallel to a horizon; and
      a flight path vector group further comprising:
         a flight path vector indicator;
            a potential flight path vector indicator;
            a potential thrust indicator,
   a configuration of said potential thrust indicator relative to said pitch ladder, said flight path vector indicator and said potential flight path vector indicator representing current engine power parameters and desired engine power parameters of said aircraft.

43. The method of claim 42, said presenting flight indicator information further comprising presenting said flight indicator information on said display, said flight path vector group being oriented on said display in relation to said pitch ladder and said line.

44. The method of claim 42, said presenting said flight indicator information further comprising presenting said flight indicator information on said display, said potential thrust indicator further comprising a thrust and a drag limit indicator and at least one throttle indicator.

45. The method of claim 42, said aircraft display comprising a HUD.

46. The method of claim 42, said aircraft display comprising a PFD.

47. The method of claim 42, said aircraft display comprising an HDD.

48. The method of claim 42, said aircraft display comprising an HMD.

49. The method of claim 42, said aircraft display comprising a CRT.

50. The method of claim 42, said aircraft display comprising an LCD.

51. A product made in accordance with the method of claim 1.

52. A product made in accordance with the method of claim 42.

* * * * *